(12) United States Patent
Aibazov

(10) Patent No.: US 9,336,478 B2
(45) Date of Patent: May 10, 2016

(54) CONTACTLESS CHIP CARD

(71) Applicant: Oleg Umarovich Aibazov, Moscow (RU)

(72) Inventor: Oleg Umarovich Aibazov, Moscow (RU)

( * ) Notice: Subject to any disclaimer, the term of this patent is extended or adjusted under 35 U.S.C. 154(b) by 0 days.

(21) Appl. No.: 14/415,532

(22) PCT Filed: Mar. 21, 2013

(86) PCT No.: PCT/RU2013/000055
§ 371 (c)(1),
(2) Date: Jan. 16, 2015

(87) PCT Pub. No.: WO2014/104921
PCT Pub. Date: Jul. 3, 2014

(65) Prior Publication Data
US 2015/0206046 A1    Jul. 23, 2015

(30) Foreign Application Priority Data
Dec. 28, 2012   (RU) .................. 2012158001

(51) Int. Cl.
*G06K 19/06* (2006.01)
*G06K 19/077* (2006.01)
*H01Q 1/22* (2006.01)
*H01Q 7/00* (2006.01)

(52) U.S. Cl.
CPC .... *G06K 19/07775* (2013.01); *G06K 19/07773* (2013.01); *H01Q 1/2225* (2013.01); *H01Q 7/00* (2013.01)

(58) Field of Classification Search
USPC ............. 235/492, 451, 487; 340/572.7, 572.8
See application file for complete search history.

(56) References Cited

U.S. PATENT DOCUMENTS

| | | | |
|---|---|---|---|
| 5,569,879 A | 10/1996 | Gloton et al. | |
| 6,666,380 B1 * | 12/2003 | Suzuya | G06K 19/07749 235/380 |
| 7,044,388 B2 * | 5/2006 | Kamiya | G06K 19/072 235/441 |
| 7,793,837 B1 * | 9/2010 | Faith | G06K 19/083 235/375 |
| 2010/0019038 A1 | 1/2010 | Puente Baliarda et al. | |
| 2015/0235122 A1 * | 8/2015 | Finn | G06K 19/07794 235/439 |

FOREIGN PATENT DOCUMENTS

JP       H11219420 A       8/1999

* cited by examiner

*Primary Examiner* — Ahshik Kim
(74) *Attorney, Agent, or Firm* — Andrew W. Chu; Craft Chu PLLC

(57) ABSTRACT

The device contains a flat card, a microcircuit, a dielectric substrate onto which the microcircuit is installed, and an antenna, which is made of an electrical conductor provided along the periphery of and in the plane of the flat card and connected to the microcircuit. The antenna is in the form of a frame, made of an electrical conductor, and a dielectric layer, provided within the electrical conductor, with a hollow space being formed within the frame. At least one partition is installed in the hollow space within the frame, forming through-openings which run transversely relative to the plane of the flat card. One end of the partition is connected to the dielectric layer of the frame. The electrical conductor of the antenna is made of a noble metal.

24 Claims, 3 Drawing Sheets

CONTACTLESS CHIP CARD

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention relates to information ID-cards and may be used for cashless payments, e.g., in credit bank operations, in stores, in public transport, etc.

2. Description of Related Art Including Information Disclosed Under 37 CFR 1.97 and 37 CFR 1.98.

This invention is in development of the technical solution according to RF U.S. Pat. No. 2,244,634, C1, IPC B42D15/10, published on 20 Jan. 2005, "PAYMENT V.I.P. CARD (VARIANTS)".

One of the variants of the known invention is that wherein a pay card comprising a housing, a microprocessor device, elements of features of a pay system and an issuing bank, protection and personalization, wherein the housing of the said pay card is made of a precious or rare metal, the said elements of the features of a pay system and an issuing bank, protection and personalization being made of precious and/or semi-precious stones (RU, C1, 2244634).

The known device uses gold, and/or platinum, and/or silver as the precious metal. Brilliants, and/or sapphires, and or emeralds, and/or similar stones are used as precious stones. Nephrite, and/or lazurite, and/or chalcedony, and/or stones similar to them are used as semi-precious stones. Furthermore, the elements of the features relating to a pay system and an issuing bank, protection and personalization may be made engraved, and/or inlaid, and/or threaded, and/or electro-formed.

A limitation of this device is high consumption of precious metals which the pay card housing is made of. Moreover, information for this card may not be entered and read out remotely, since no means are provided for this operation; and if this very design is used, such means may not be implemented without altering International Standards ISO 7816, ISO 1443. This device may not employ the modern technology of NFC (Near Field Communication), that is, the technology of short-range RF wireless communication that enables data exchanges between devices being at a distance of about 10 centimeters (app. 4 inches). A NFC device may communicate with existing smart-cards, readers according to ISO Standard 1443 and with other NFC devices, and, thus, is compatible to the existing infrastructure of contactless cards already used in public transport and pay systems.

The least consumption of a precious metal is realized in a pay card that comprises a foil layer, a first layer and a second layer, which are laminated, the foil layer being secured between the first layer and the outer second layer. The device further comprises a plastic sheet, a magnetic strip, an adhesive layer, and an insert that has a thickness greater than that of the foil layer and is made of the same material as the foil layer, and a decorative element that is secured inside the insert flush therewith. The outer surfaces of the second layer and the insert are situated on the same plane, and the insert and the decorative element are free of the second layer on the outside and are secured in the plastic sheet by the adhesive layer. The foil layer length and width are selected so as to be less than those of the plastic sheet. (WO 2011/081563, A1, publ. 07.07.2011), (RU, No. 96525, U1, publ. 10.08.2010).

The foil layer in this technical solution may be made of a noble (precious) metal. The decorative element may be made of a natural, or precious, or semi-precious stone.

This device has no means for data inputting to and reading from the pay card remotely (i.e., NFC). Moreover, the use of the first and the second laminating layers impairs the visual appearance of the foil layer, if the latter is made of a noble metal.

The closest solution is a contactless chip card comprising a flat card, primarily of rectangular shape, a IC chip, a dielectric substrate with the IC chip installed thereon, an antenna made of an electric conductor that is arranged along the periphery of the flat card plane and connected by contact conductors to the IC chip. (JP, A, 11-219420).

The device represents a laminated plastic card ("smart-card"), wherein the antenna is made in the form of a multiturn coil.

A microprocessor having memory (electronic chip) may be used as the IC chip. Due to the availability of an antenna, these types of devices may communicate with a remote reading device. The antenna not only performs the function of a communication means, but also may be used for obtaining energy necessary for powering the electronic chip. Such devices—chip cards—are presently used as a means of payments for goods bought at a purchase place (these are known as "bank cards"), for calls made from public phones, for car parking, for travels in public transport, etc. Such devices are also embedded into mobile phones and labels.

But such chip cards are "faceless" per se, since the feature elements relating to a pay system and an issuing bank, protection and personalization are introduced directly into the IC memory, and, if such features become known to a stranger, a malefactor can use such cards easily. Furthermore, such plastic cards are not sufficiently reliable, their service life is limited due to the possibility of mechanical damage.

Conventional pay cards of various pay systems have, due to their mass production, an insufficient set of features providing for individual preferences of their holders, including the requirements of uniqueness, protection, art design, etc., as stated in Specification to RU, C1, 2244634.

There has always existed a category of clients, where each client would like to get even more attention from banks, originality, good showing and attention to his/her person, as well as the uniqueness of a pay instrument evidencing a definite social status. And such VIP-clients provide banks with a significant part of income.

The task of expanding the set of technical means and creating a pay tool complying with wishes of bank privileges clients is, in principle, solved by RU, C1, 2244634, but such cards are not remotely operated and require high consumption of noble metals.

This task is absolutely not complied with by a chip card known from JP, A, 11-219420, which is intended for mass production and which does not comprise any noble metals.

SUMMARY OF THE INVENTION

This invention is based on the task of providing a contactless chip card that ensures a longer service life, has improved performance and reliability due to the use of noble metals subject to regulating or minimizing their consumption, as well as that is personalized due to a variety of appearances, and, thus, has improved performance, being a card for servicing VIP-clients.

To solve the stated task, in the known chip card comprising a flat card, mainly of a rectangular shape, an IC chip, a dielectric substrate with the IC chip installed thereon, an antenna made of an electric conductor arranged along the periphery in the plane of the flat card and connected to the IC chip, according to the invention the antenna is made as a framework composed of an electric conductor and a dielectric layer arranged within the electric conductor, a space is formed within the framework, at least one partition is introduced into the space within the framework with forming through apertures transversely to the plane of the flat card, at least one end of the partition is connected to the framework dielectric layer, and the electric conductor is made of a noble metal.

Additional embodiments of the device are possible, wherein it is expedient that:
the other end of the partition is also connected to the framework dielectric layer;
the other end of the partition is connected to the dielectric substrate with an IC chip installed thereon;
the partition is installed either longitudinally, or transversely, or slantwise;
the partition is made arc-like;
at least two partitions are used, and one of the partitions is connected to the other one;
gold, or silver, or platinum, or an alloy thereof is used as the material of the antenna electric conductor;
mother-of pearl, or leucosapphire, or polykor, or a natural stone is used as the material of the framework dielectric layer;
gold, or silver, or platinum, or an alloy thereof is used as the material of the partition;
mother-of pearl, or leucosapphire, or polykor, or a natural stone is used as the material of the partition;
the antenna electric conductor is made rectangular or square in its cross-section;
the framework dielectric layer is made rectangular or square in its cross-section;
the antenna electric conductor is connected to the IC chip by contact conductors, and the material for the contact conductors is the same as for the antenna electric conductor;
the flat card corners are rounded;
a protective dielectric layer is introduced, which is arranged at the end of the flat card, on the antenna electric conductor;
an additional inner framework is introduced, which is arranged on and joined to the dielectric layer of the said framework, and one end of the partition is connected to the framework dielectric layer via the additional inner framework.

For the last mentioned additional embodiment of the device:
gold, or silver, or platinum, or an alloy thereof can be used as the material of the additional inner framework;
mother-of pearl, or leucosapphire, or polykor, or a natural stone is used as the material of the additional inner framework.

Furthermore, the antenna may be made as a multiturn coil. For this embodiment:
a dielectric is arranged between the turns of the antenna electric conductor;
the dielectric material is the same as that used for the framework dielectric layer;
a dielectric element is introduced, which is arranged between the inner turns of the antenna and one of the contact conductors, and this one contact conductor is connected to the outer turn of the antenna electric conductor, and the other contact conductor is connected to the inner turn of the antenna electric conductor.

A group of partitions representing a branched system may be used, wherein it is expedient that:
the group of partitions is made as an ornament;
precious and/or semi-precious stones are introduced, which are installed in the partitions.

The said advantages of the device as well as its specific features are explained below on the best mode of carrying it out with reference to the accompanying drawings.

DETAILED DESCRIPTION OF THE DRAWINGS

Figure 1:
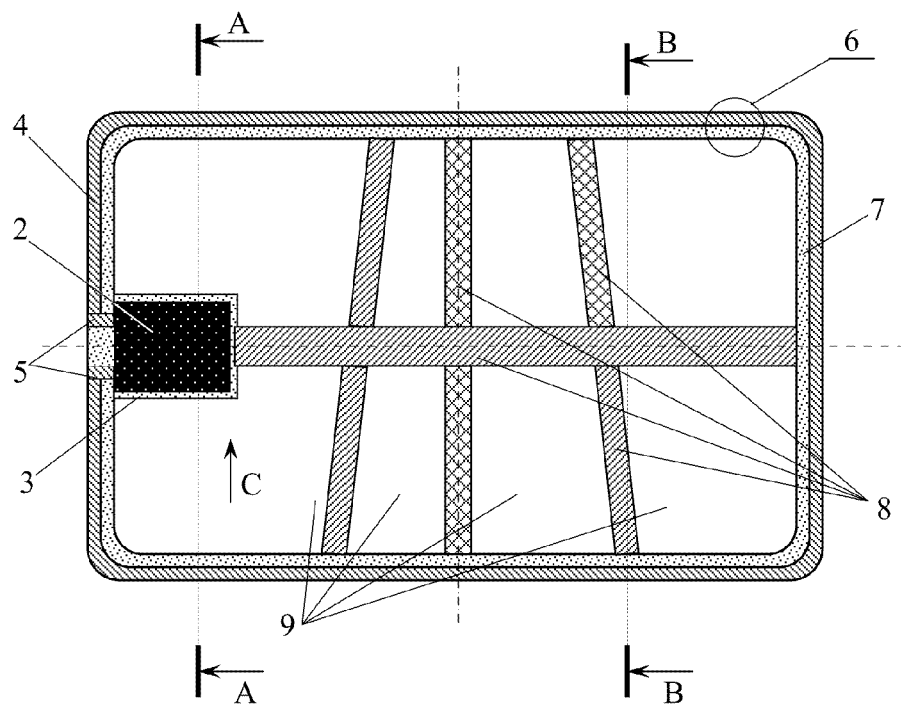
FIG. 1 shows a schematic view of the inventive contactless chip card.

The chip card (FIGS. 1-4) comprises a flat card 1 of rectangular shape, an IC 2 (electronic chip), a dielectric substrate 3 on which the IC 2 is installed. The device antenna is made of an electric conductor 4 that is arranged along the periphery in the plane of the flat card 1 and is connected to the IC 2 by contact conductors 5. The antenna is made as a framework 6 composed of the electric conductor 4 and a dielectric layer 7 arranged within the electric conductor 4, with formation of a space within the framework 6. At least one partition 8 is introduced, which is arranged in the space within the framework 6 with formation of through apertures 9 transversely relative to the plane of the flat card 1. At least one end of the partition 8 is connected to the dielectric layer 7 of the framework 6. The electric conductor 4 of the antenna is made of a noble metal. (The hatching types of patterns in FIG. 1 in the longitudinal section of the flat card 1 are shown rather conditionally for the easy understanding of the drawing).

The other end of the partition 8 (FIGS. 1, 6) may be also connected to the dielectric layer 7 of the framework 6.

The other end of the partition 8 (FIGS. 1, 5, 6) may be connected to the dielectric substrate 3 on which the IC 2 is installed.

The partition 8 may be arranged longitudinally or transversely or slantwise (FIG. 1).

Figure 5:
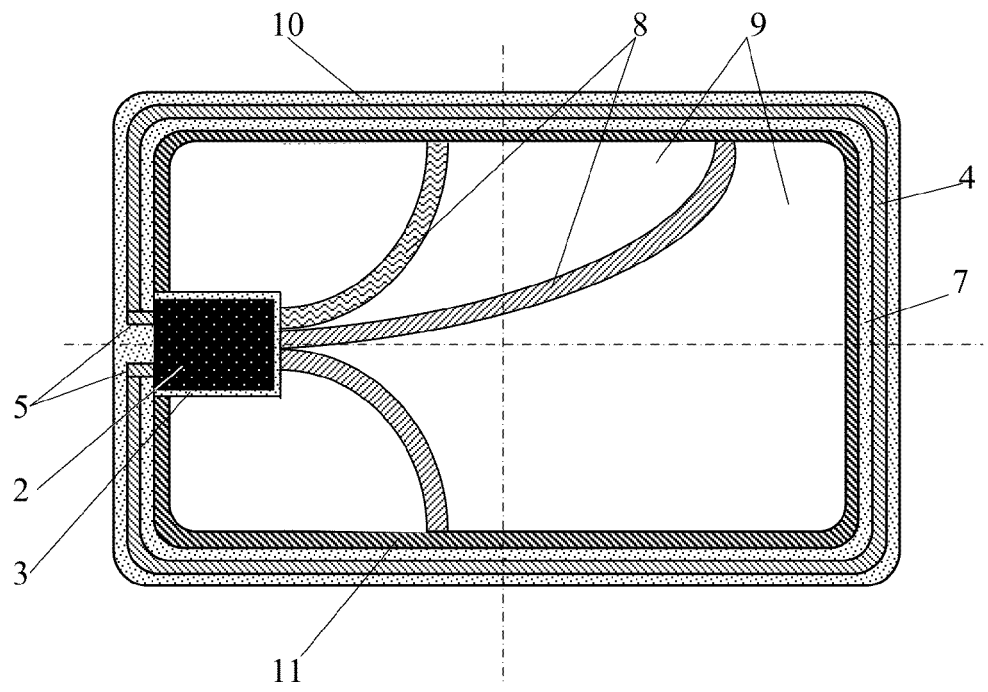
FIG. 5 is another schematic view of another embodiment.

The partition 8 may be made arc-like (FIG. 5).

At least two partitions 8 may be used, one of the partitions being connected to the other partition (FIG. 1, 6).

Gold, or silver, or platinum, or an alloy thereof may be used as the material of the antenna electric conductor 4.

Mother-of-pearl, or leucosapphire, or polykor, or a natural stone may be used as the material of the dielectric layer 7 of the framework 6.

Gold, or silver, or platinum, or an alloy thereof may be used as the material of the partition 8.

Mother-of-pearl, or leucosapphire, or polykor, or a natural stone may be used as the material of the partition 8.

Figure 2:
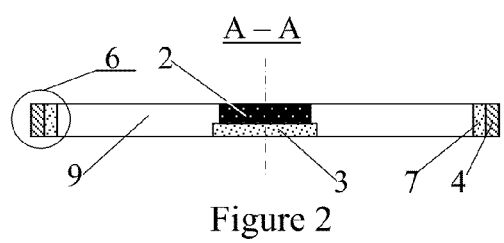
FIG. 2 shows a cross-sectional view along line A-A in FIG. 1.
Figure 3:
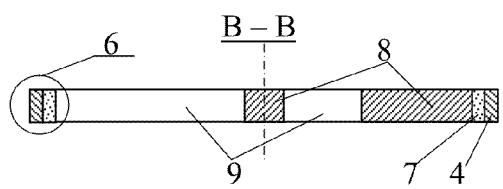
FIG. 3 shows another cross-sectional view along line B-B in FIG. 1.
Figure 4:
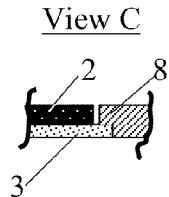
FIG. 4 shows a partial cross-sectional view of section C in FIG. 1.

The antenna electric conductor 4 is made rectangular or square in its cross-section (FIGS. 2, 3).

The dielectric layer 7 of the framework 6 is made rectangular or square in its cross-section (FIGS. 2, 3).

Figure 6:
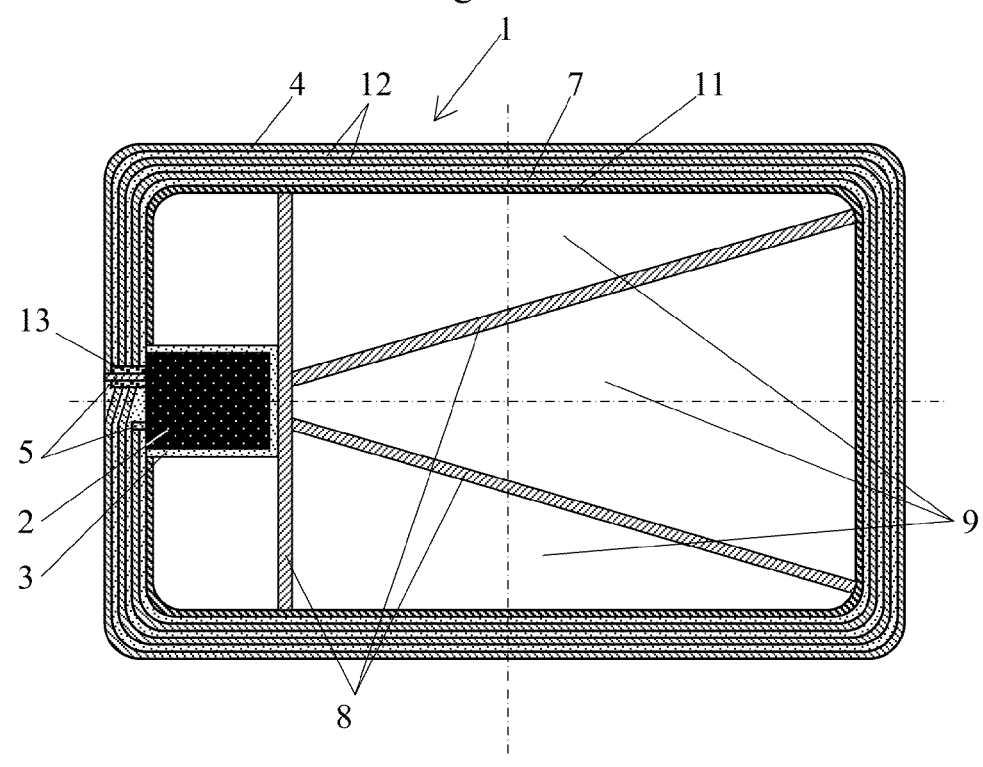
FIG. 6 is still another schematic view of still another embodiment, when the antenna is made as multiturn coil.

The material for the contact conductors 5 is the same as for the antenna electric conductor 4 (FIGS. 1, 5, 6).

The corners of the flat card 1 are rounded (FIGS. 1, 5-8).

The protective dielectric layer 10 may be introduced, which is arranged at the end of the flat card 1, on the antenna electric conductor 4 (FIG. 5).

Furthermore, an additional inner framework 11 may be introduced, which is arranged on and joined to the dielectric layer 7 of the said framework 6, and one end of the partition 8 is connected to the dielectric layer 7 of the framework 6 via the additional inner framework 11 (FIG. 5-8).

Gold, or silver, or platinum, or an alloy thereof may be used as the material of the additional inner framework 11, as well as mother-of-pearl, or leucosapphire, or polykor, or a natural stone may be used as the material of the additional inner framework 11.

Additionally, the antenna may be made as a multiturn coil (FIG. 6).

A dielectric 12 is arranged between the turns of the antenna electric conductor 4.

The dielectric 12 is made of the same material as the dielectric layer 7 of the framework 6.

In order to connect the IC 2 to the multiturn antenna, a dielectric element 13 is introduced, which is arranged between the inner turns of the antenna and one of the contact conductors 5; and this one contact conductor 5 is connected to the outer turn of the antenna electric conductor 4, and the other contact conductor 5 is connected to the inner turn of the antenna electric conductor 4.

Figure 7:
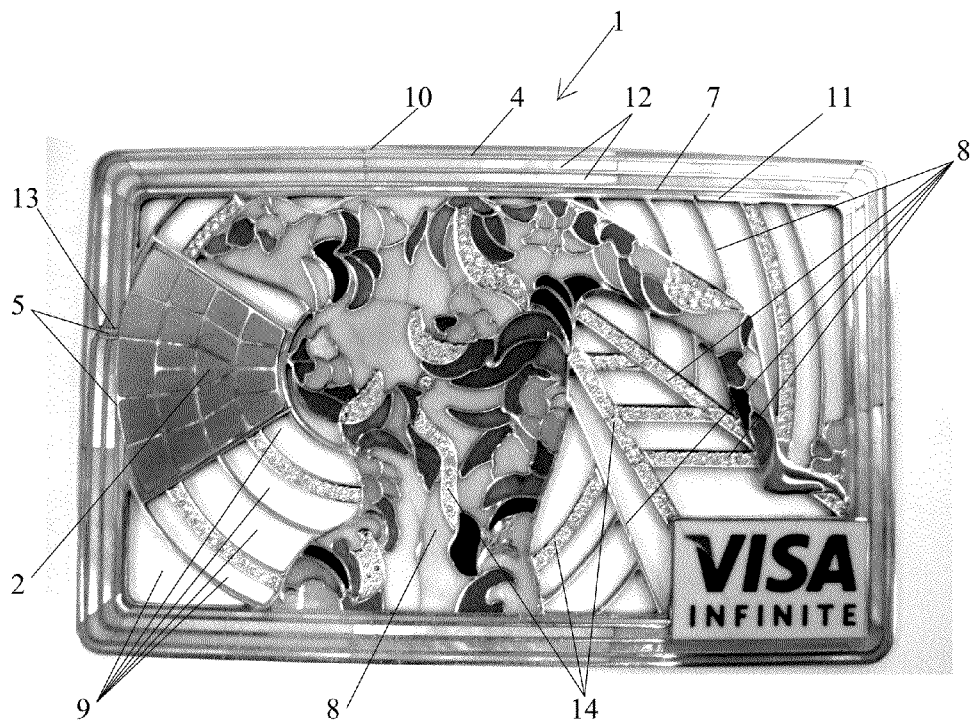
FIG. 7 is a photographic view of an embodiment of the finished article made in accordance with this invention, showing the external view, face side.
Figure 8:
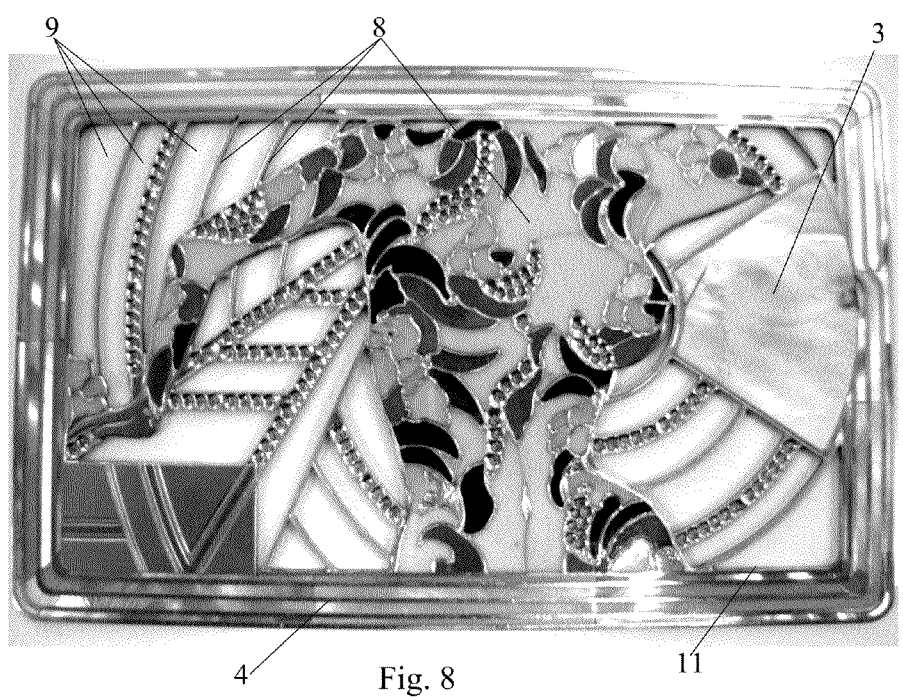
FIG. 8 is a photographic view of the embodiment of FIG. 7, showing a reverse side.

A group of partitions representing a branched system may be used in the chip card (FIGS. 7, 8).

This group of partitions is made as an ornament (of various designs, for example, according to the user's sketch).

Precious and/or semi-precious stones 14 may be introduced into the chip card (at the user's wish), which may be installed into the partitions 8 (FIG. 7).

The operation of the chip card (FIG. 1) is ensured by the following factors.

Noble metals are not subjected to oxidation, exhibit high hardness and strength, and, therefore, ensure higher reliability and service life of the article as compared to other materials.

Since the antenna is made as the framework 6 composed of the electric conductor 4 the dielectric layer 7 arranged within the electric conductor 4, with formation of a space within the framework 6, and at least one partition 8 is introduced, which is arranged in the space within the framework 6 with formation of the through apertures 9 transversely relative to the plane of the flat card 1, and the antenna electric conductor 4 is made of a noble metal, required rigidity of the flat card 1 may be ensured, while reducing consumption of the noble metal due to the presence of the through apertures 9. The use of the dielectric layer 7 in the framework 6 also reduces the required amount of the noble metal.

Also, required rigidity of the flat card 1 is ensured, e.g., by connection of one end of the partition 8 to the dielectric layer 7 and its other end to the opposite side of the framework 6 (FIG. 1, 6), or by connection of the other end of the partition 8 to the dielectric substrate 3 on which the IC 2 is installed (FIGS. 1, 5, 6).

The partition 8 may be arranged in a different manner, either longitudinally, or transversely, or slantwise (FIG. 1). It may be made, for example, arc-like (FIG. 5).

The use of dielectric materials (electric insulators) as the material of the partition 8 also reduces the use of a noble metal.

In order to improve the appearance of the device and its strength and insulating properties, mother-of-pearl, and/or leucosapphire, and/or polykor, and/or a natural stone, e.g., a semi-precious stone, may be used as the material of the dielectric layer 7 of the framework 6 and the material of the partition 8.

The design is simplified without compromising the antenna electric characteristics due to the fact that the electric conductor 4 and the dielectric layer 7 of the antenna framework 6 are made rectangular or square in their respective cross-sections (FIGS. 2, 3).

The introduction of the protective dielectric layer 10, which is arranged at the end of the flat card 1 on the antenna electric conductor 4 (FIG. 5), enables to protect the antenna electric conductor 4, as arranged at the end, against mechanical damage.

Moreover, noble metals, as compared to others, possess very high electrical conductance, therefore, the technical characteristics of the antenna comprising the electric conductor 4 made of a noble metal are improved. In order to improve the characteristics (e.g., range and efficiency) of contactless receipt/transfer of information, the antenna may be made multiturn (FIGS. 6-8).

The use of the additional inner framework 11, which is arranged on and joined to the dielectric layer 7 of the antenna framework 6, enables to connect the partition(s) 8 to the dielectric layer 7 of the framework 6 via the additional inner framework 11 (FIGS. 5-8). This implementation enables to keep the essential design of the antenna in making a wide variety of contactless chip cards, while changing only the design of the partitions 8 and the through apertures 9 within the additional inner framework 11. It is possible to change the number of the partitions 8, their locations and appearance (shape), and, consequently, modify the inner ornament according to a user's wish, without affecting the design of the antenna itself. This enables to realize various individual designs of the device by providing a variety of appearances according to users' wishes. Proceeding from a user's wish, gold, or silver, or platinum may be used as the material of the additional inner framework 11 as well as mother-of-pearl, or leucosapphire, or polykor, or a natural stone may be used as the material of the additional inner framework 11.

The cost of the flat card 1 may be easily changed by using, as the material of the partitions 8, mother-of-pearl, or leucosapphire, or polykor, or a natural stone, rather than a noble metal, as well as by changing the number of the partitions 8 made of a noble metal, or by using or not using precious and/or semi-precious stones 14 in the partitions 8 (FIG. 7). Thus, an individual VIP-card may be made for users having different financial resources, while preserving the exclusivity of a contactless chip card for every user.

As a variant of the finished article (FIGS. 7, 8) a contactless chip card is shown, having all the essential feature of this invention.

The illustrated flat card 1 (FIGS. 7, 8) has transversal, longitudinal, slantwise, arc-like partitions 8 with the through apertures 9, which are decorated or not decorated with precious and/or semi-precious stones 14. The central transversal partition 8, which carries the main load, is made dielectric, in the form of a woman silhouette made of jasper. This jasper is inlaid with other semi-precious stones. Here, for example, charoite and jadeite are used. The antenna is a multiturn one, has the electric conductor 4 made of gold and the dielectric layer 7 made of mother-of-pearl. Mother-of-pearl is also used for the dielectric substrate 3 of the IC chip 2 and the dielectric 12 arranged between the turns of the electric conductor 4. As can be seen in FIGS. 7, 8, the invention represents a merge of a modern technical device, i.e., a contactless chip card, and an exclusive piece of jewelry.

The contactless chip card may be produced as follows (FIGS. 7, 8).

A gold-silver alloy (addition of a small quantity of copper is possible) is used for making a sheet. This alloy is melted in an induction melting unit. After the alloy is heated approximately to 1,100 degrees, it will be poured into a forming mold. A bar with the thickness of 3 mm is obtained in the result. Then the bar is rolled to the sheet thickness of 0.95 mm, which is cut according to the card outline. Thus, the flat card 1 is obtained.

The flat card 1 is fixed in a special tooling, the electric conductor 4 of the framework 6 and the partitions 8 with the through apertures 9 are milled. The central transversal partition 8 in the form of a woman silhouette is made of jasper (a dielectric), the dielectric substrate 3 for the IC chip is made of mother-of-pearl, and the other required elements of the flat card 1 are made separately.

Also, where necessary, the additional inner framework 11 is made by milling. A gold-silver alloy and mother-of-pearl is used as the material of the additional inner framework 11.

Natural stones, e.g., jasper, jadeite, charoite, as well as the dielectric layer 7 of the framework 6, the dielectric 12 (mother-of-pearl) are glued into the milled through apertures 9 with the use of a special glue paste. Some through apertures 9 are kept open.

After the glue paste solidifies, the flat card 1 with the glued natural stones is grinded and polished to the required thickness on a disc with an abrasive paste.

Then, the flat card 1 is engraved and provided with precious stones 14 (brilliants).

Finally, the IC chip 2 is glued onto the dielectric substrate 3 (mother-of-pearl), the dielectric element 13 is attached, and the IC chip 2 is connected to the electric conductor 4 of the framework 6 by the contact conductors 5.

INDUSTRIAL APPLICABILITY

The inventive chip card may be most successfully applied for cards intended for servicing VIP-clients, e.g., for cards based on the NFC technology.

What is claimed is:

1. A chip card comprising:
    a flat card, having substantially a rectangular shape,
    an integrated circuit,
    a dielectric substrate, said integrated circuit being installed on said dielectric substrate, and
    an antenna comprised of a electric conductor arranged along a periphery in a plane of said flat card and connected to said integrated circuit,
    wherein said antenna is a framework, said framework being comprised of an electric conductor, a space, and a dielectric layer arranged within said electric conductor,
    wherein at least one partition is installed in said space within said framework, the one partition forming through apertures in a direction relative to said plane of said flat card, at least one end of the one partition being connected to said dielectric layer, and
    wherein said electric conductor of said antenna is comprised of a material selected from a group consisting of: gold, silver, platinum, and an alloy thereof.

2. The chip card according to claim 1, wherein the partition has another end connected to said dielectric layer of said framework.

3. The chip card according to claim 1, wherein the partition has another end connected to said dielectric substrate.

4. The chip card according to claim 1, wherein the partition is installed according to said direction selected from one of a group consisting of: longitudinally, transversely, and slantwise.

5. The chip card according to claim 1, wherein the partition is arc-like.

6. The chip card according to claim 1, wherein at least two partitions are used, a first partition of the two partitions being connected to a second partition of the two partitions.

7. The chip card according to claim 1, wherein said dielectric layer is comprised of a material selected from a group consisting of: mother-of-pearl, leucosapphire, polykor, and a natural stone.

8. The chip card according to claim 1, wherein said at least one partition is comprised of a material selected from a group consisting of: gold, silver, platinum, and an alloy thereof.

9. The chip card according to claim 1, wherein said at least one partition is comprised of a material selected from a group consisting of: mother-of-pearl, leucosapphire, polykor, and a natural stone.

10. The chip card according to claim 1, said electric conductor has a cross-section shaped as one of a group consisting of: rectangular and square.

11. The chip card according to claim 1, wherein said dielectric layer has a cross-section shaped as one of group consisting of: rectangular and square.

12. The chip card according to claim 1, further comprising: contact conductors, connecting said electric conductor to said integrated circuit and being comprised of a material identical to a material of said electric conductor.

13. The chip card according to claim 1, wherein said flat card has rounded corners.

14. The chip card according to claim 1, further comprising: a protective dielectric layer arranged at a butt end of said flat card on said electric conductor.

15. The chip card according to claim 1, further comprising: an additional inner framework installed on and joined to said dielectric layer, wherein said additional inner framework connects one end of the partition to said dielectric layer.

16. The chip card according to claim 15, wherein said additional inner framework is comprised of a material selected from a group consisting of: gold, silver, platinum, and an alloy thereof.

17. The chip card according to claim 15, wherein said additional inner framework is comprised of a material selected from a group consisting of: mother-of-pearl, leucosapphire, polykor, and a natural stone.

18. The chip card according to claim 1, wherein the antenna is comprised of a multiturn coil.

19. The chip card according to claim 18, further comprising: a dielectric arranged between turns of said electric conductor.

20. The chip card according to claim 19, wherein said dielectric is comprised of a material identical to a material of said dielectric layer.

21. The chip card according to claim 15, further comprising:

contact conductors, connecting said electric conductor to said integrated circuit; and a dielectric element arranged between antenna inner turns and one of the contact conductors, wherein said one of the contact conductors connects to an outer turn of said electric conductor, and wherein another contact conductor connects to an inner turn of said electric conductor.

22. The chip card according to claim 1, wherein said at least one partition being comprised of a group of partitions, said group of partitions being branched.

23. The chip card according to claim 22, wherein said group of partitions is shaped as an ornament.

24. The chip card according to claim 22, further comprising: stones arranged in the partitions, said stones being comprised of a material selected from a group consisting of precious stones and semi precious stones.

* * * * *